April 24, 1934.  D. G. ROOS  1,955,934
RUMBLE SEAT TOP
Filed Sept. 13, 1933   2 Sheets-Sheet 1
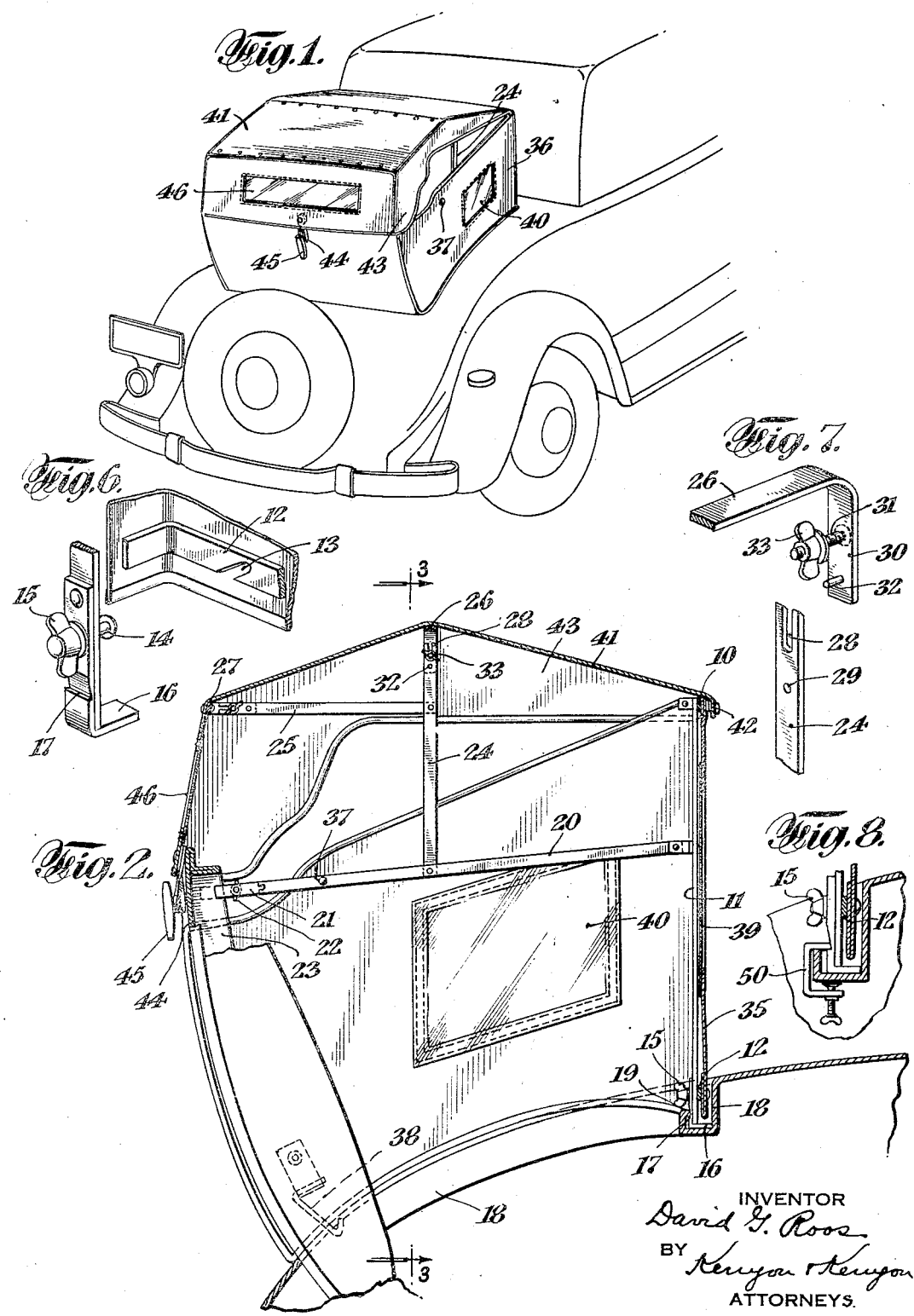
INVENTOR
David G. Roos
BY Kenyon & Kenyon
ATTORNEYS.

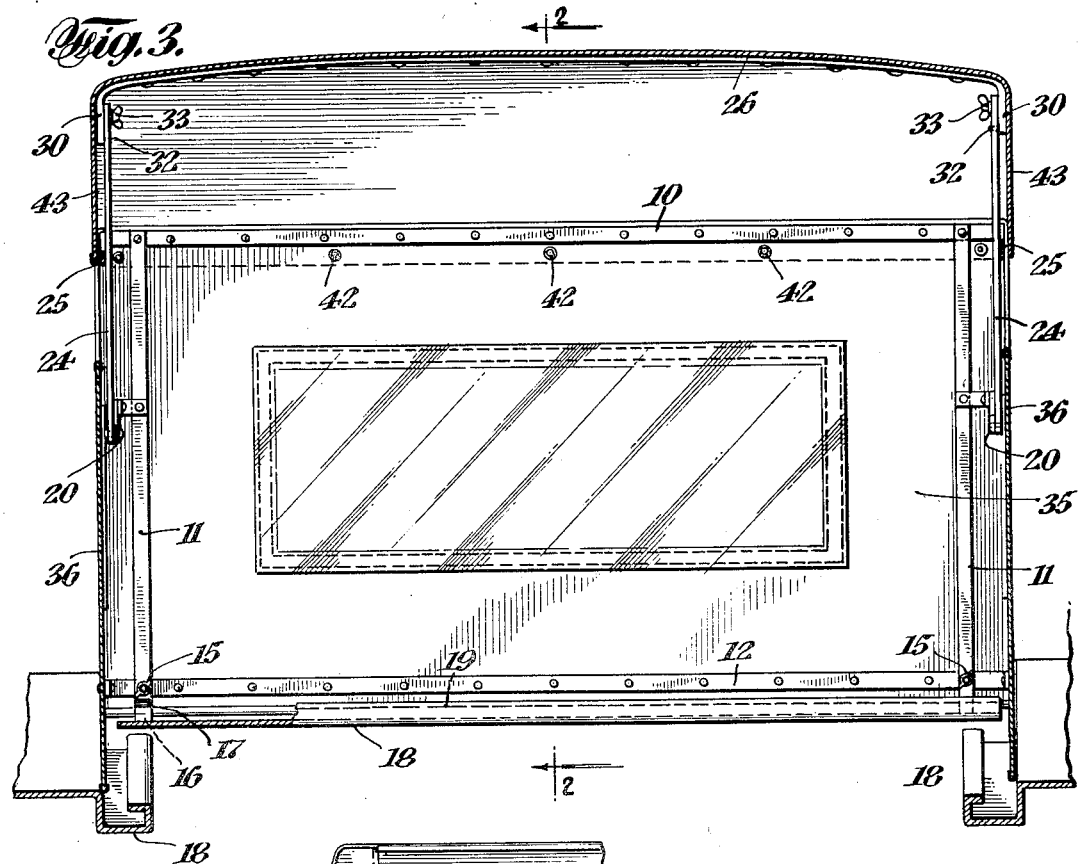
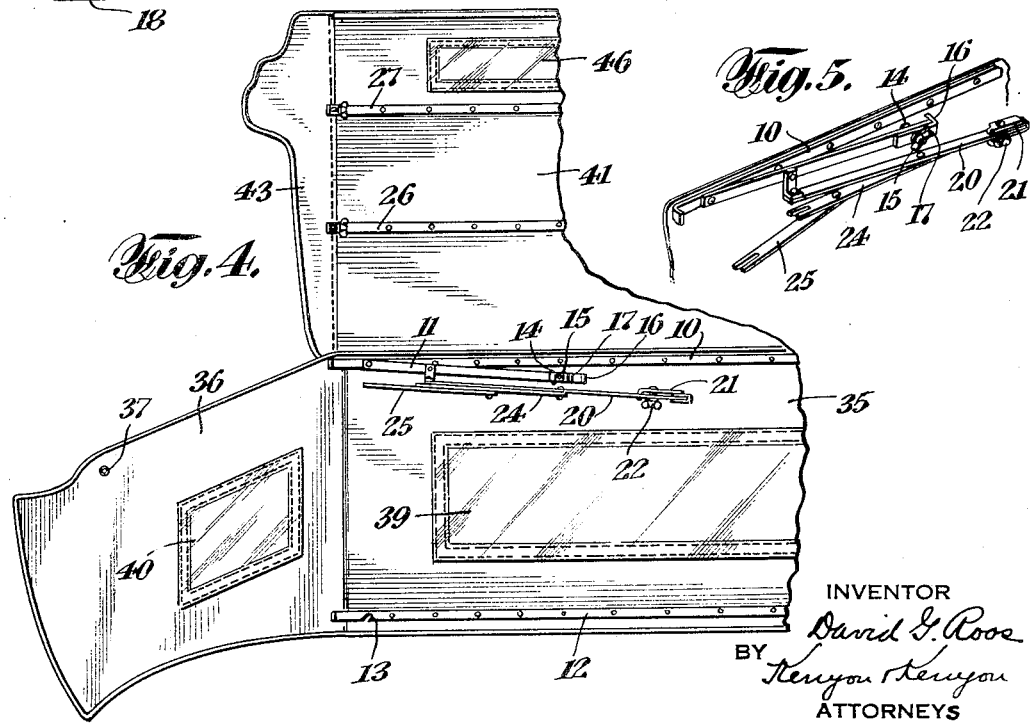

Patented Apr. 24, 1934

1,955,934

UNITED STATES PATENT OFFICE 1,955,934

RUMBLE SEAT TOP

David G. Roos, Nyack, N. Y.

Application September 13, 1933, Serial No. 689,186

6 Claims. (Cl. 296—99)

This invention relates to rumble seat tops and has for an object an improved top which may be readily attached and detached and may be collapsed into compact form for storage.

A rumble seat top embodying the present invention may be attached to the body of an automobile without any additions to or alterations in the automobile body.

A rectangular front frame has legs which fit into the transverse portion of the rain-groove extending around the rumble seat pit and are held firmly in the rain-groove by the engagement of the rear lip of the rain-groove in notches provided in the legs. Arms extend rearwardly from the side members of the front frame and are provided with clamps which grip flanges formed on the rumble seat back these flanges normally fitting into the longitudinal portions of the rain-groove when the rumble seat is closed. The front frame carries a windshield which is permanently attached to the top and bottom members of the frame and side curtains are permanently attached to the side ends of the windshield. The rearwardly extending arms have braces pivoted thereto and the braces have rearwardly extending struts pivoted to them. A cover has its front edge detachably attached to the top edge of the windshield and is permanently attached to a transverse frame member detachably carried by the free ends of the braces. The cover is also permanently attached to a second transverse frame member detachably carried by the free ends of the struts. The rear end of the cover extends down from the second transverse frame member and is held by a strap loop around the handle on the top edge of the rumble seat back. The top of the rear end of each side curtain is detachably fastened to the rear end of a rearwardly extending arm and at its lower edge is provided with a hook which is adapted to catch under the rear end of the rain groove, thereby firmly holding the side curtain in place.

The vertical side pieces of the front frame are pivotally connected to the ends of the top member and are detachably connected to the ends of the bottom member. After the two transverse frame members of the cover have been detached from the braces and struts respectively and the cover itself disconnected from the windshield, the vertical pieces of the front frame may be disconnected from the bottom member and these frame members, together with the arms, braces and struts may be arranged in alinement with the top piece of the front frame and may be rolled up in the windshield together with the side curtains. The transverse frame members may be rolled up in the cover. The entire rumble seat top is thus collapsible into two compact rolls for storage.

Other objects, novel features and advantages of this invention will be apparent from the following specification and accompanying drawings, wherein:

Fig. 1 is a perspective view of the rumble seat top attached to an automobile;

Fig. 2 is a longitudinal section through the top substantially on the line 2—2 of Fig. 3;

Fig. 3 is a transverse section through the top substantially on the line 3—3 of Fig. 2;

Fig. 4 is a view of the top in partially collapsed condition;

Fig. 5 is a similar view at another angle,

Figs. 6 and 7 are detail views of the connections between different parts of the frame; and Fig. 8 is a detail view of a modification.

The front frame consists of a top member 10 to which are pivotally attached side members 11. The bottom member 12 of the front frame is provided near its ends with oblique slots 13 and the side members 11 are provided with bolts 14 threaded into the members 11 and wing nuts 15 are non-rotatably fastened to the bolts 14. The shanks of the bolts 14 are adapted to be received in the slots 13 and the frame member 12 is clamped to the frame members 11 by the heads of the bolts when the same are turned by means of the wing nuts 15. The side members 11 extend appreciably below the bottom member 12 to form legs having horizontal portions 16. Also below the wing nuts 15 there are provided transverse notches or shoulders 17. As clearly shown in Fig. 2, the legs of the front frame are arranged in the transverse portion of the rain-groove 18 which surrounds the rumble seat pit, this rain-groove being standard equipment for rumble seat bodies. The inner edge of the rain-groove terminates in a horizontally arranged lip 19 which is received in the notches 17 to lock the legs in the rain-groove. In inserting the legs into the rain-groove, the front frame is tilted forward at its upper end and dropped until the portion 16 rests on the bottom of the rain-groove after which the frame is straightened to vertical position wherein the lip 19 snaps into the notches. The frame is removed from the rain-notch by reverse procedure.

Arms 20 are pivotally attached at their front ends to the frame members 11 and their rear ends are provided with clamps 21 which are operated by means of a thumb screw 22. The clamps are adapted to grip the flanges 23 of the rumble seat back, thus maintaining the front frame in vertical position. Braces 24 are pivotally connected at one end to the arms 20 and struts 25 are pivotally connected at one end to the braces 24, the braces 24 being adapted to stand in vertical position while the struts 25 are adapted to be arranged in horizontal position. A transverse frame member 26 is detachably connected at its ends to the free ends of the braces 24 with a second transverse member 27 detachably connected at its ends to the free ends of the struts 25. Each brace 24 is provided at its free end with a slot 28 and a hole 29. The frame member 26 is provided with a right angle extension 30 on which is mounted a threaded stud 31 and a pin 32, a wing nut 33 being threaded on the stud 30. To connect the brace 24 to the frame member 26, the wing nut 33 is backed to the end of the stud 31 and the brace 24 is moved to arrange the stud in the slot 28 and the pin 32 in the hole 29. Thereupon the wing nut is screwed into clamping relation to the brace 24. The transverse frame may thus be attached to the brace without removal of the wing nut 33, thereby obviating loss of the wing nut. Similar connecting means are provided between the struts 25 and the transverse frame 27.

A windshield 35 is permanently connected along its upper edge to the frame member 10 and along its lower edge to the frame member 12, but is not connected to the side members 11. Side curtains 36 have their front edges permanently connected to the side edges of the windshield 35 and have their upper rear edges detachably connected to the rear ends of the arms 20 by snap fasteners 37. Hooks 38 are provided near the bottom rear edge of the side curtains and are adapted to catch under the ends of the rain groove 18 to hold the side pieces firmly in place. The windshield and side curtains are provided with windows 39 and 40 respectively of celluloid or other suitable flexible transparent material. A cover 41 is detachably connected at its front end by snap-fasteners 42 to the top edge of the windshield 35 and is provided with side flaps 43. The cover is permanently attached to the side frames 26 and 27 and hangs down from the transverse frame member 27. The loop 44 is attached to the rear edge of the cover and is adapted to extend around the handle 45 of the rumble seat back to hold the cover in proper position. A window 46 of celluloid or other suitable flexible transverse material is provided in the vertical portion of the cover 41.

Assuming that the top is in erected condition as shown in the drawings, it may be easily and quickly taken down and stored away in compact space. The loop 44 is detached from the handle 45 and the frame members 26 and 27 are disconnected from the braces 24 and struts 25 respectively by backing the nuts 33 to the ends of the studs 31 and disengaging the pins 32 and studs 31 from the holes 29 and slots 28 respectively. The front edge of the cover 41 may now be disconnected from the top edge of the windshield 39 or may be left attached thereto to be later removed. The hooks 38 are disconnected from the rain-groove and the side curtains are unfastened from the arms 20 after which the front frame is tilted forwardly to disengage the notches 17 from the flange 19 and lift it to remove the top from the car. If the cover 41 was not previously disconnected from the windshield it may now be disconnected. The struts 25, braces 24 and arms 20 are now swung into alinement with the side pieces 11 and then the side pieces are released from the bottom member 12 by turning the wing nuts 15 and bolts 14 and sliding the bottom member 12 to move the bolts 14 out of the slots 13. Next the side pieces 11 and with them the struts 25, braces 24 and arms 20 are swung into alinement with the top piece 10 of the front frame as shown in Figs. 4 and 5. The side curtains are then folded over the windshield and rolled up into a single compact bundle and the cover is then rolled up around the windshield, side curtains, frame members, braces, struts and arms. The top is thus collapsed into compact condition in which it is readily storable.

Although the bottom edges of the flaps 43 of the cover 41 are shown as being spaced from the top edges of the side curtains 36, it is to be understood that it is within the contemplation of the invention that these edges meet or overlap and form a complete enclosure. However, the arrangement shown is preferable as it affords the desired ventilation.

When the top is in place, a person may get into or out of the rumble seat merely by releasing the strap 44 from the handle 45 and pushing the cover forward, the braces 24 swinging about their pivots to permit such movement of the cover. After a person has stepped into or out of the rumble seat, the cover is swung back into the closing position and the loop 44 is again engaged with the handle 45.

The rumble seat top above described may also be used for cars in which the rain-groove is not equipped with the lip 19. As shown in Fig. 8, such rain-groove may be provided with clamps 50 which may be detachably mounted on the rain-groove and having projections extending into the rain-groove in position to fit into the notches 17 and thus lock the frame in place.

It is of course understood that various modifications may be made in the structure above described, without in any way departing from the spirit of the invention as defined in the appended claims.

I claim:

1. A detachable and collapsible top for automobile rumble seats in which the seat pit is provided at its front edge with a transverse rain-groove having a forwardly projecting horizontal lip and a seat back having side flanges hinged in the pit, said top comprising a front frame having legs projecting into the rain-groove, said legs having rear notches to receive said lip to lock said frame in place and horizontal bottom extensions to rest on the bottom of the rain-groove in engagement with the front wall thereof, and arms pivotally connected to said frame and having rear end clamps to grip said flanges.

2. A detachable and collapsible top for automobile rumble seats in which the seat pit is provided at its front edge with a transverse rain-groove having a forwardly projecting horizontal lip and a seat back having side flanges hinged in the pit, said top comprising a front rectangular frame having its side members pivotally connected to the top member and detachably connected to the bottom member, said side members being prolonged to form legs projecting into the rain-groove, said legs having rear notches to receive said lip to hold the legs in place and horizontal bottom extensions to rest on the bottom of the rain-groove in engagement with the front wall thereof, and arms pivotally connected to the side members of said front frame and having rear clamps to grip said flanges.

3. A detachable and collapsible top for automobile rumble seats in which the seat pit is provided at its front edge with a transverse rain-groove having a forwardly projecting horizontal lip and a seat back having side flanges hinged in the pit, said top comprising a front frame having legs projecting into the rain-groove, said legs having rear notches to receive said lip to lock said frame in place and horizontal bottom extensions to rest on the bottom of the rain-groove in engagement with the front wall thereof, arms pivotally connected to said frame and having rear end clamps to grip said flanges, a windshield carried by said front frame, and side curtains attached at their front edges to the side edges of the windshield and detachably connected at their rear ends to said arms.

4. A detachable and collapsible top for automobile rumble seats in which the seat pit is provided at its front edge with a transverse rain-groove having a forwardly projecting horizontal lip and a seat back having side flanges hinged in the pit, said top comprising a front rectangular frame having its side members pivotally connected to the top member and detachably connected to the bottom member, said side members being prolonged to form legs projecting into the rain-groove, said legs having rear notches to receive said lip to hold the legs in place and horizontal bottom extensions to rest on the bottom of the rain-groove in engagement with the front wall thereof, arms pivotally connected to the side members of said front frame and having rear clamps to grip said flanges, a windshield attached at its top and bottom edges respectively to the top and bottom members of said front frame, and side curtains having their front edges attached to the side edges of the windshield and having their rear ends detachably connected to said arms.

5. A detachable and collapsible top for automobile rumble seats in which the seat pit is provided at its front edge with a transverse rain-groove having a forwardly projecting horizontal lip and a seat back having side flanges hinged in the pit, said top comprising a front rectangular frame having its side members pivotally connected to the top member and detachably connected to the bottom member, said side members being prolonged to form legs projecting into the rain-groove, said legs having rear notches to receive said lip to hold the legs in place and horizontal bottom extensions to rest on the bottom of the rain-groove in engagement with the front wall thereof, and arms pivotally connected to the side members of said front frame and having rear clamps to grip said flanges, braces pivotally connected to said arms, a transverse frame member detachably connected to the ends of said braces, struts pivotally connected to said braces, a second transverse frame member detachably connected to the ends of said struts, a windshield having its top and bottom edges connected respectively to the top and bottom members of the front frame, side curtains attached at their front edges to the side edges of the windshield and detachably connected at their rear ends to said arms, a cover detachably connected at its front edge to the top edge of the windshield and permanently attached to each of said transverse frame members.

6. A detachable and collapsible top for automobile rumble seats in which a seat back is hinged in a pit provided at its front edge with a transverse rain-groove, said top comprising a front frame having legs projecting into the rain-groove and having notches, means on said rain-groove fitting into said notches to lock said frame in place, arms pivotally connected to said frame, and means on the free ends of said arms for detachably connecting said arms to said seat back.

DAVID G. ROOS.